H. E. HOOVER.
FIBER BEARING.
APPLICATION FILED MAR. 14, 1918.

1,325,849.

Patented Dec. 23, 1919.
2 SHEETS—SHEET 1.

Witness.
Edward T. Wray.

Inventor.
H. Earl Hoover.
by Parker & Carter
Attorneys.

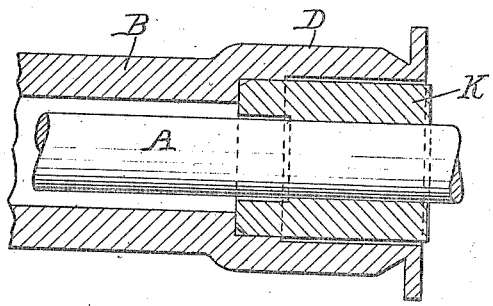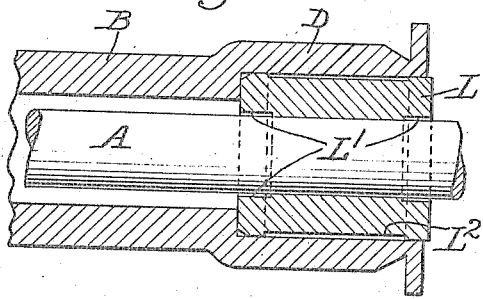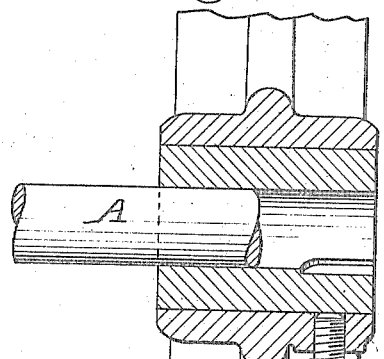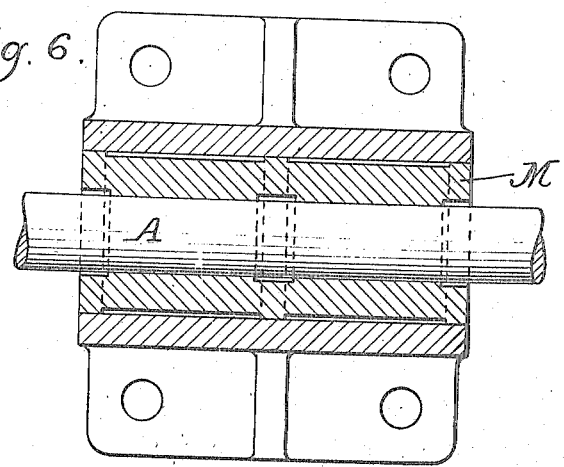

UNITED STATES PATENT OFFICE.

HOWARD EARL HOOVER, OF CHICAGO, ILLINOIS, ASSIGNOR TO THE HOOVER SUCTION SWEEPER COMPANY, OF NEW BERLIN, OHIO, A CORPORATION OF OHIO.

FIBER BEARING.

1,325,849.　　　　　Specification of Letters Patent.　　Patented Dec. 23, 1919.

Application filed March 14, 1918. Serial No. 222,291.

*To all whom it may concern:*

Be it known that I, HOWARD EARL HOOVER, a citizen of the United States, residing at Chicago, in the county of Cook and State of Illinois, have invented a certain new and useful Improvement in Fiber Bearings, of which the following is a specification.

My invention relates to improvements in and process of fitting bearings, and has particular relation to the small size high speed so called oilless bearings made of fiber, wood or similar lubricant impregnated material. One common use for such bearings, and I have illustrated my invention in connection with such a device, is for the brush in a suction sweeper, though obviously these bearings might be used and are used in many different circumstances.

Experience has shown that with these small fiber or wood bearings they are ordinarily first forced by pressure, into a hole or socket provided for them. They are then at once or later reamed out to proper size so that the shaft passing through them may turn freely. Experience shows that when these bearings are allowed to stand for a while before being reamed out they mature and if they are reamed out some months after they are pressed into place they remain properly sized and rotate freely on the shaft but if they are first pressed in and then soon reamed out to proper size, experience shows that after a month or so they will no longer be the proper size and will not rotate freely on the shaft. The reason for this obviously is that the more or less important distortion and compression of the fibrous material caused by forcing the small cylindrical bearing sleeve into its seat sets up stresses in the material which only gradually adjust themselves, and thus a bearing which once was properly sized before this adjustment takes place is changed in size and shape during the progress of this adjustment. Obviously it is not practical to hold a large number of bearings waiting for this adjustment to take place, and so means must be provided for making this unneeessary.

One reason why the bearings are locked on the shaft by the contraction of the bearing due to the readjustment of the internal stresses is that there must be a tight fit between the bearing and shaft to prevent rattle particularly so when there is an intermittent or pulsating load on the bearings as in the case of a beating brush for a suction sweeper. Therefore, it will be seen that only a slight contraction will suffice to prevent a great deal of trouble.

I accomplish my purpose by so arranging the oilless bearing sleeve and the surfaces of contact between it and the shaft and it and the socket in which it is mounted that these two contact surfaces are nowhere cut by the same radius, that is to say, where the bearing sleeve is in contact with the shaft it is not in contact with the socket and vice versa and in order to make sure that the fibers will have ample room to bend or change in shape or position there is a short distance measured along the axis of the shaft between the two parallel planes terminating the ends of the contact surfaces of the bearing sleeve with the pocket and with the shaft.

In one form I slightly reduce the outer diameter of the bearing both inside and out so that the bearing does not engage the shaft throughout its entire length, and does not engage the seat or pocket throughout its entire length. I may turn down the outside of the bearing cylinder for the larger part of its length leaving the shoulder at one end which engages the seat or I may countersink the pocket which contains the bearing so as to leave a plain cylindrical bearing in contact with the pocket only where reduced or I may turn down the central portion of the outside of the bearing leaving a shoulder at each end adapted to engage the inside of the pocket or seat. But in any event, I so arrange the contact surfaces that where the bearing is in contact with the pocket it is not in contact with the shaft and vice versa. Or where a long bearing sleeve is used, I might have a plurality of ribs inside and out so that the shaft and the pocket would be engaged at a number of different points but still always at different positions along the axis of the bearing. One form that would seem to be very desirable where a comparatively long bearing is used would be one in which the central inner portion of the bearing was cut away so that the bearing is in engagement with the shaft only at the ends but is clamped into the seat by an enlarged part at the center leaving the ends of the sleeve reduced or at least out of contact with the pocket containing them.

No matter what the arrangement in its detail and obviously many other arrangements might be employed the result is that a bearing once forced into position may be trued up reamed out and put away with full knowledge no matter how long it stands, no matter how great its distortion within reason or how much ripening takes place, still the bearing will turn freely on the shaft when put in use.

My invention is illustrated more or less diagrammatically in the accompanying drawings wherein—

Fig. 3 is a section showing a modified form;

Fig. 4 is a further modification;

Fig. 5 is similar to Fig. 4 except that the arrangement of the inside and outside of the sleeve are reversed;

Fig. 6 is a further modification;

Fig. 7 shows a further modified form.

Like parts are indicated by like letters in all the figures.

Figure 1:
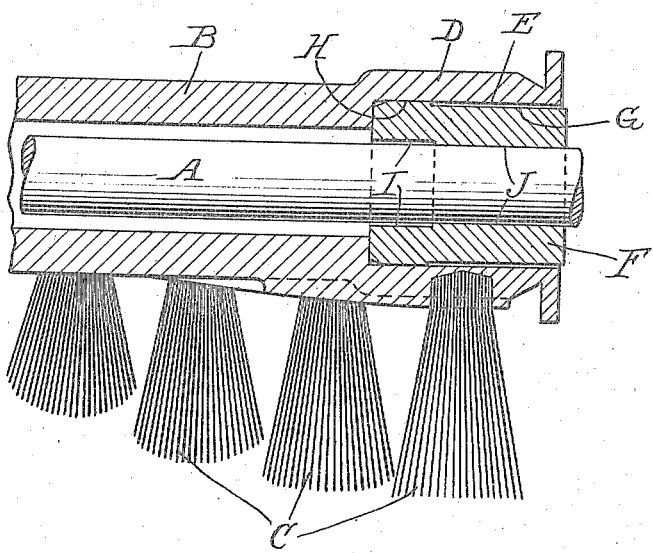
Figure 1 is a section of one form of the suction sweeper brush with bearing in place.
Figure 2:
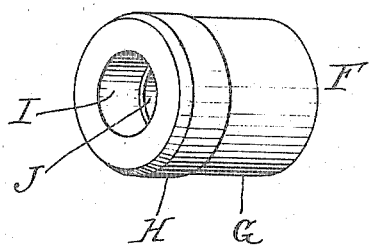
Fig. 2 is a perspective view of the device of Fig. 1.

A is a shaft upon which the bearing is to be rotatably mounted. This shaft may be supported by any suitable means not here illustrated. I have shown rotating on this shaft a brush body B. Obviously this particular kind of bearing need not be limited to use in connection with a suction sweeper brush but for the sake of showing some use, I have so illustrated it. The shaft B has projecting outwardly therefrom a series of bristle bunches which in this case act as beaters so that the load on the bearings is intermittent being heavy when beating is taking place and light when the bristles are out of contact with the work. The shaft has enlarged ends D containing sockets E larger than the shaft. The socket is substantially concentric with the brush body and contains the cylindrical oilless wood bearing sleeve F. This bearing sleeve is turned down on its outside throughout most of its length as at G, but is left full size at H to engage the wall of the pocket E so that when it is forced into place it engages the pocket only at the inner end where it is full size and is slightly out of engagement with the pocket with the supporting seat formed in the wall thereof throughout the major part of its length. The inside of the bearing at I is bored out larger than the remainder. This part of the inner diameter is substantially in register with the part on the outside of larger diameter engaging the seat. The remainder of the bearing is reamed out as at J to closely fit and travel upon the shaft and therefore that part which is in engagement with the walls of the socket in the end of the brush is not in engagement with the shaft itself.

In Fig. 3 the outside of the bearing sleeve K is cylindrical throughout its entire length and the end of the hollow shaft is cut away or counterbored so that the end of the bearing sleeve fits in, the remainder of the sleeve being out of contact with the wall of the pocket. Thus this portion of the pocket merely acts as a shield for the sleeve. It might be cut off and the sleeve operated in exactly the same way being supported only at its end in the hollow shaft.

In Fig. 4 the bearing sleeve L is bored at each end as at $L^1$ and reduced on the outside between the ends as at $L^2$ and in Fig. 5 this is just reversed and the sleeve $L^3$ is turned down at its ends on the outside and bored out intermediate its ends on the inside.

In Fig. 6 the sleeve M is bored out at each end and also intermediate the ends and turned down at two places on the outside intermediate its ends. It will be noted particularly in the later form where the bearing sleeve contacts the pocket in which it is contained at a number of different places that only a very short length of sleeve need be disposed in contact with the containing pocket because with the point of contact widely separated the turning moment is effectively resisted and a very large part of the sleeve can be used as bearing surface.

It will be noted above that I have shown the bearing sleeve in a pocket or socket in the end of the hollow rotating shaft. Obviously in connection with many kinds of machinery the pocket or socket would be in some fixed abutment and the shaft would be rotated but this would be the only change involved and the arrangement of parts would be exactly the same no matter for what kind of machinery the bearing was being used.

I have shown also the bearing locked in place by a set screw which set screw exerts a pressure on the bearing that might otherwise cause it to bind on the shaft were it not for the fact that the bearing is adjacent the shaft cut away so as to prevent any direct transmission of force from the set screw itself directly through the distorted fibers of the sleeve to the shaft.

It will be evident that while I have shown in my drawings an operative device still many changes might be made both in size shape and arrangement of parts without departing materially from the spirit of my invention and I wish, therefore, that my drawings be regarded as in a sense diagrammatic.

It will be understood that where I have used the term "socket", I mean a hole or aperture or place where the removable bearing sleeve is mounted. That socket may be in a brush, a spindle, a wheel a bracket or any other part of a machine and it makes no difference whether the socket and bearing rotate and the shaft is at rest or the shaft rotates in a bearing and socket which are at rest, the result and operation is to all intents and purposes the same.

It will be noted also that the distance through which the distortion caused by pressure on the outside of the bearing spreads and makes itself felt on the inside is relatively small and if we apply pressure localized by a set screw on the outside of the bearing, it is sufficient to cut away only a small part of the bearing beneath the set screw to take care of the fibrous distortion and strains and avoid all difficulty.

Obviously localized pressure which would tend to distort the bearing and thus grip the shaft and which must be compensated for by cutting away the inside of the bearing sleeve may be caused by the pressure exerted by the set screw or by a wedge or rivet or by compressing a split socket or driving the sleeve into a socket a little smaller than it is. This localized pressure may be applied at one single spot, along a broad line parallel with the axis of the sleeve, or on a circular line perpendicular to the axis of the sleeve or any other desired way and no matter where it is applied, I arrange the bearing sleeve on the shaft so that by cutting away some part or by relieving some part of the sleeve I prevent this localized pressure from being translated in terms of distortion of the shaft engaging portion of the bearing.

The use and operation of my invention are as follows:—

The wood or fiber bearings which ordinarily come from the factory in the form of a hollow cylindrical bearing blank may be turned down on the outside throughout the major part of their length and then bored out from the inside on their end to overlap the reduced part so that the bored out part is always longer than the unreduced part of the outside. In another exemplification the blank may be reduced intermediate its ends on the outside and enlarged intermediate its ends on the inside or it may be left cylindrical on the outside and bored out almost throughout its length on the inside or it may be bored out at each end and reduced intermediate its ends in which case as above indicated depending on the peculiar desires of the designer and the purposes for which the device may be used and the place where it is to be put.

In every event, however, no matter how the specific blank is treated the finished bearing blank which has been prepared is forced into the pocket or socket in the enlarged end of the brush body or in any other suitable place where such pocket or socket may be disposed. The inner bearing is then reamed out to size but such size is always less than the diameter of the bored out or increased inner portion of the sleeve. The shaft is then inserted and turns freely with respect to the bearing. Of course, the fiber or fabric of the material is placed under serious strains by compression and is more or less distorted when the sleeve bearing is forced into place and these strains and distortions cause a certain amount of movement and displacement of the fiber of the bearing and this distortion is slightly but steadily transmitted and felt at the inside of the sleeve, and would as above indicated lock the sleeve and shaft together were it not for the fact that such distortion is not sufficient to bring the enlarged or bored out portion of the bearing sleeve in contact with the shaft and cannot affect the sized portion of the sleeve because the sized portion is sufficiently removed from that part of the sleeve where the pressure is felt.

I claim:—

1. A bearing comprising a socket, a bearing sleeve fitting within the socket, a shaft in rotatable relation with the bearing sleeve said sleeve having part of its interior surface out of contact with the shaft and part of its exterior surface out of contact with the socket.

2. A bearing comprising a socket, a bearing sleeve fitting within the socket, a shaft in rotatable relation with the bearing sleeve said sleeve having part of its interior surface out of contact with the shaft and part of its exterior surface out of contact with the socket the two non-contacting surfaces being at opposite ends of the bearing.

3. A bearing comprising a socket, a bearing sleeve fitting within the socket, a shaft in rotatable relation with the bearing sleeve said sleeve having part of its interior surface out of contact with the shaft and part of its exterior surface out of contact with the socket, the interior and exterior non-contacting surfaces being spaced from one another along the axis of the sleeve.

4. A bearing comprising a socket, a bearing sleeve fitting within the socket, a shaft in rotatable relation with the bearing sleeve said sleeve having part of its interior surface out of contact with the shaft and part of its exterior surface out of contact with the socket the two non-contacting surfaces being at opposite ends of the bearing the interior and exterior non-contacting surfaces being spaced from one another along the axis of the sleeve.

5. A bearing comprising a socket a hollow bearing sleeve located therein a shaft rotatable within such sleeve the bearing sleeve having a part of its inner surface out of contact with the shaft and a part of its outer surface out of contact with the wall of the socket.

6. A bearing comprising a socket a hollow bearing sleeve located therein a shaft rotatable within such sleeve the bearing sleeve having a part of its inner surface out of contact with the shaft and a part of its outer surface out of contact with the wall of the socket the portions of the sleeve which are in contact with the shaft and with the socket being removed from one another in a direction parallel with the axis of rotation of the shaft.

7. A bearing comprising a socket a hollow bearing sleeve located therein a shaft rotatable within such sleeve the sleeve being out of contact with the socket for a part of its length and in contact with the shaft throughout that portion of its length where it is out of contact with the socket only.

8. A bearing comprising a socket a hollow bearing sleeve located therein a shaft rotatable within such sleeve the inside and outside of the sleeve being laid to a plurality of different diameters the socket engaging the largest diameter of the outside of the sleeve the shaft engaging the smallest diameter of the inside of the sleeve.

9. A bearing comprising a socket a hollow bearing sleeve located therein a shaft rotatable within such sleeve the inside and outside of the sleeve being laid to a plurality of different diameters the socket engaging the largest diameter of the outside of the sleeve the shaft engaging the smallest diameter of the inside of the sleeve the sleeve areas of larger inside and outside and smaller inside and outside diameters being respectively in register.

10. The combination with a shaft of a bearing rotatable with respect thereto, a socket for containing said bearing, that part of the bearing which engages the socket being out of contact with the shaft.

11. The combination with a shaft of a bearing sleeve rotatable with respect thereto, a socket in which such bearing sleeve is adapted to be contained and means associated with said socket for exerting a localized pressure upon the outside of the bearing sleeve, the inside of the bearing sleeve being cut away adjacent the shaft and in line with the direction of such localized pressure.

12. A bearing comprising a rigid socket, a bearing sleeve therein having a shoulder at one end, the body of the sleeve being of smaller diameter than the socket, a bearing surface located within that part of the sleeve which is out of engagement with the socket, the shoulder being of greater interior diameter than the bearing.

13. A bearing comprising a rigid socket, a bearing sleeve therein having a shoulder at one end, the body of the sleeve being of smaller diameter than the socket, a bearing surface located within that part of the sleeve which is out of engagement with the socket, the sleeve at its shoulder end being of greater interior diameter than the bearing, the shouldered end of the sleeve being bored out to greater interior diameter than the bearing portion of the sleeve the increased diameter continuing within the sleeve for a distance not less than the length of the shoulder.

In testimony whereof, I affix my signature in the presence of two witnesses this fifth day of March, 1918.

HOWARD EARL HOOVER.

Witnesses:
MINNIE M. LINDEMAN,
MARION L. INGRAHAM.